United States Patent
Duan et al.

(10) Patent No.: US 11,120,646 B2
(45) Date of Patent: Sep. 14, 2021

(54) FAULT MODEL AUGMENTATION SYSTEMS AND METHODS

(71) Applicant: GM GLOBAL TECHNOLOGY OPERATIONS LLC, Detroit, MI (US)

(72) Inventors: Shiming Duan, Ann Arbor, MI (US); Chaitanya Sankavaram, Rochester Hills, MI (US); Azeem Sarwar, Rochester Hills, MI (US); Ibrahim Haskara, Macomb, MI (US); Chunhao J. Lee, Troy, MI (US); Chen-fang Chang, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 243 days.

(21) Appl. No.: 16/420,687

(22) Filed: May 23, 2019

(65) Prior Publication Data
US 2020/0372729 A1    Nov. 26, 2020

(51) Int. Cl.
  *G07C 5/02* (2006.01)
  *G06N 20/00* (2019.01)
  *G07C 5/08* (2006.01)

(52) U.S. Cl.
  CPC .............. *G07C 5/02* (2013.01); *G06N 20/00* (2019.01); *G07C 5/08* (2013.01)

(58) Field of Classification Search
  CPC .................................. G07C 5/02; G06N 20/00
  USPC ...................................................... 701/32.9
  See application file for complete search history.

(56) References Cited

U.S. PATENT DOCUMENTS

| | | | | |
|---|---|---|---|---|
| 10,124,893 | B1* | 11/2018 | Aalund | B64C 39/024 |
| 2003/0195675 | A1* | 10/2003 | Felke | G05B 23/0278 701/29.3 |
| 2006/0064291 | A1* | 3/2006 | Pattipatti | G05B 23/0251 703/14 |
| 2007/0088974 | A1* | 4/2007 | Chandwani | G06F 11/0724 714/6.11 |
| 2015/0193993 | A1* | 7/2015 | Rood | F02D 41/22 701/51 |
| 2016/0075357 | A1* | 3/2016 | Jung | B61L 27/04 701/20 |
| 2019/0122456 | A1* | 4/2019 | Sata | G07C 5/0841 |

OTHER PUBLICATIONS

U.S. Appl. No. 16/247,746, filed Jan. 15, 2019, Haskara et al.

* cited by examiner

*Primary Examiner* — Gertrude Arthur Jeanglaude
(74) *Attorney, Agent, or Firm* — Harness, Dickey & Pierce, P.L.C.

(57) ABSTRACT

A fault diagnostic system includes: memory including a fault model, the fault model including: a plurality of failure modes of a vehicle; and symptoms respectively associated with each of the failure modes; an updating module configured to: based on a data set, determine a new failure mode that is not already included in the fault model and new symptoms indicative of the occurrence of the new failure mode; modify the fault model by: adding the new failure mode to the fault model; and adding the new symptoms to the fault model in association with the new failure mode; and re-save the fault model in the memory.

20 Claims, 4 Drawing Sheets

FIG. 4

FAULT MODEL AUGMENTATION SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to diagnostic systems and methods and more particularly to systems and methods for augmenting fault models for vehicles.

A vehicle includes a plurality of control modules that control respective actuators of the vehicle. For example, the vehicle may include an engine control module that controls actuators of an internal combustion engine of the vehicle. The vehicle includes a transmission control module that controls actuators of a transmission of the vehicle.

The vehicle may include one or more diagnostic modules that diagnose faults in the vehicle. For example, a diagnostic module may diagnose a fault in a component of the vehicle when one or more parameters satisfy one or more conditions.

The diagnostic module may take one or more remedial actions when a fault is diagnosed. For example, the diagnostic module may store a diagnostic trouble code (DTC) associated with the fault in memory. Additionally or alternatively, the diagnostic module may light a malfunction indicator (e.g., light).

SUMMARY

In a feature, a fault diagnostic system includes: memory including a fault model, the fault model including: a plurality of failure modes of a vehicle; and symptoms respectively associated with each of the failure modes; and an updating module configured to: based on a data set, determine a new failure mode that is not already included in the fault model and new symptoms indicative of the occurrence of the new failure mode; modify the fault model by: adding the new failure mode to the fault model; and adding the new symptoms to the fault model in association with the new failure mode; and re-save the fault model in the memory.

A vehicle system includes the fault model and a diagnostic module configured to selectively diagnose faults in the vehicle based on one or more vehicle operating parameters and the fault model.

In further features, the diagnostic module is configured to selectively diagnose a fault associated with the new failure mode when the one or more vehicle operating parameters are indicative of the new symptoms associated with the new failure mode occurring concurrently.

In further features, the updating module is configured to modify the fault model in response to receipt of user input indicative of a confirmation to add the new failure mode and the new symptoms.

In further features, the updating module is configured to determine boundaries for one of the new symptoms using at least one classification model and the data set.

In further features, the updating module is further configured to label values of the data set based on comparisons of the values with the boundaries and to selectively adjust the boundaries based on the comparisons.

In further features, the updating module is configured to label first ones of the values as being in a first state in response to a determination that the first ones of the values are within the boundaries and to label second ones of the values as being in a second state in response to a determination that the second ones of the values are not within the boundaries.

In further features, the fault model includes rows for the failure modes and columns for the symptoms.

In a feature, a fault diagnostic system includes: memory including a fault model, the fault model including: a plurality of failure modes of a vehicle; and one or more symptoms associated with each of the failure modes; and an updating module configured to: based on a data set, determine a new combination of symptoms that are not already stored in the fault model in association with a first one of the failure modes and that are indicative of the occurrence of the first one of the failure modes; modify the fault model by: adding an additional entry for the first one of the failure modes to the fault model; and adding the new combination of symptoms to the fault model in association with the first one of the failure modes; and re-save the fault model in the memory.

In further features, a vehicle system includes: the fault model and a diagnostic module configured to selectively diagnose faults in the vehicle based on one or more vehicle operating parameters and the fault model.

In further features, the diagnostic module is configured to selectively diagnose a fault associated with the first one of the failure modes when the one or more vehicle operating parameters are indicative of the new combination of symptoms associated with the first one of the failure modes occurring concurrently.

In further features, the updating module is configured to modify the fault model in response to receipt of user input indicative of a confirmation to add the additional entry for the first one of the failure modes to the fault model and the new combination of symptoms in association with the first one of the failure modes.

In further features, the updating module is configured to determine boundaries for one of the symptoms of the new combination of symptoms using at least one classification model and the data set.

In further features, the updating module is further configured to label values of the data set based on comparisons of the values with the boundaries and to selectively adjust the boundaries based on the comparisons.

In further features, the updating module is configured to label first ones of the values as being in a first state in response to a determination that the first ones of the values are within the boundaries and to label second ones of the values as being in a second state in response to a determination that the second ones of the values are not within the boundaries.

In further features, the fault model includes rows for the failure modes and columns for the symptoms.

In a feature a fault diagnostic system includes: memory including a fault model, the fault model including: a plurality of failure modes of a vehicle; and one or more symptoms associated with each of the failure modes; and an updating module configured to: identify a first one of the failure modes having a first set of one or more associated symptoms and a second one of the failure modes having a second set of one or more associated symptoms, wherein the first set of one or more associated symptoms is the same as the second set of one or more associated symptoms; in response to a determination that the first set of one or more associated symptoms is the same as the second set of one or more associated symptoms, based on a data set, determine at least one new symptom that is not in the first set of one or more associated symptoms that is indicative of the occurrence of the first one of the failure modes; modify the fault model by adding the at least one new symptom to the fault model in association with the first one of the failure modes; and re-save the fault model in the memory.

In further features, a vehicle system includes: the fault model and a diagnostic module configured to selectively diagnose faults in the vehicle based on one or more vehicle operating parameters and the fault model.

In further features, the updating module is further configured to: in response to the determination that the first set of one or more associated symptoms is the same as the second set of one or more associated symptoms, based on the data set, determine at least one second new symptom that is not in the second set of one or more associated symptoms that is indicative of the occurrence of the second one of the failure modes; modify the fault model by adding the at least one second new symptom to the fault model in association with the second one of the failure modes; and re-save the fault model in the memory.

In further features, the updating module is configured to modify the fault model in response to receipt of user input indicative of a confirmation to add the at least one new symptom to the fault model in association with the first one of the failure modes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Fault models can be used to diagnose faults in vehicles. A fault model of a vehicle may include various failure modes and the respective sets of one or more symptoms associated with the failure modes. For example, the fault model may include a first failure mode that occurs when first, second, third, and fourth symptoms occur concurrently.

Some failure modes of the fault model, however, may not be isolatable. For example, both a first failure mode and a second failure mode may occur when first and second symptoms occur concurrently. In this example, when both of the first and second symptoms occur concurrently, both of the first and second failure modes may be diagnosed. Vehicle diagnostics and service may be made easier, faster, and less costly if each failure mode has a unique set of symptoms.

According to the present application, machine learning is used to identify additional symptoms that can be added to the fault model to isolate different failure modes having the same symptoms. For example, if a first failure mode and a second failure mode occur when first and second symptoms occur concurrently, machine learning may be used to modify the fault model such that the first failure mode occurs when first, second and third symptoms occur, while the second failure mode occurs when the first, third, and fourth symptoms occur. Occurrence of the first failure mode will therefore be isolated from occurrence of the second failure mode.

Machine learning can additionally or alternatively be used to identify new combinations of symptoms associated with the occurrence of an existing one of the failure modes. For example, the fault model may indicate that a first failure mode occurs when first, second, and third symptoms occur concurrently. Based on the machine learning, the fault model can be modified to additionally indicate that the first failure mode alternatively occurs when the second symptom and fourth and fifth symptoms occur concurrently. This may make fault diagnostics more robust.

Machine learning can additionally or alternatively be used to identify new failure modes that are not already in the fault model and the associated symptoms. For example, the fault model may include first, second, third, and fourth failure modes and the respective associated symptoms. Based on the machine learning, a fifth failure mode and its associated symptoms can be identified and added to the fault model. This may make fault diagnostics more robust.

Figure 1:
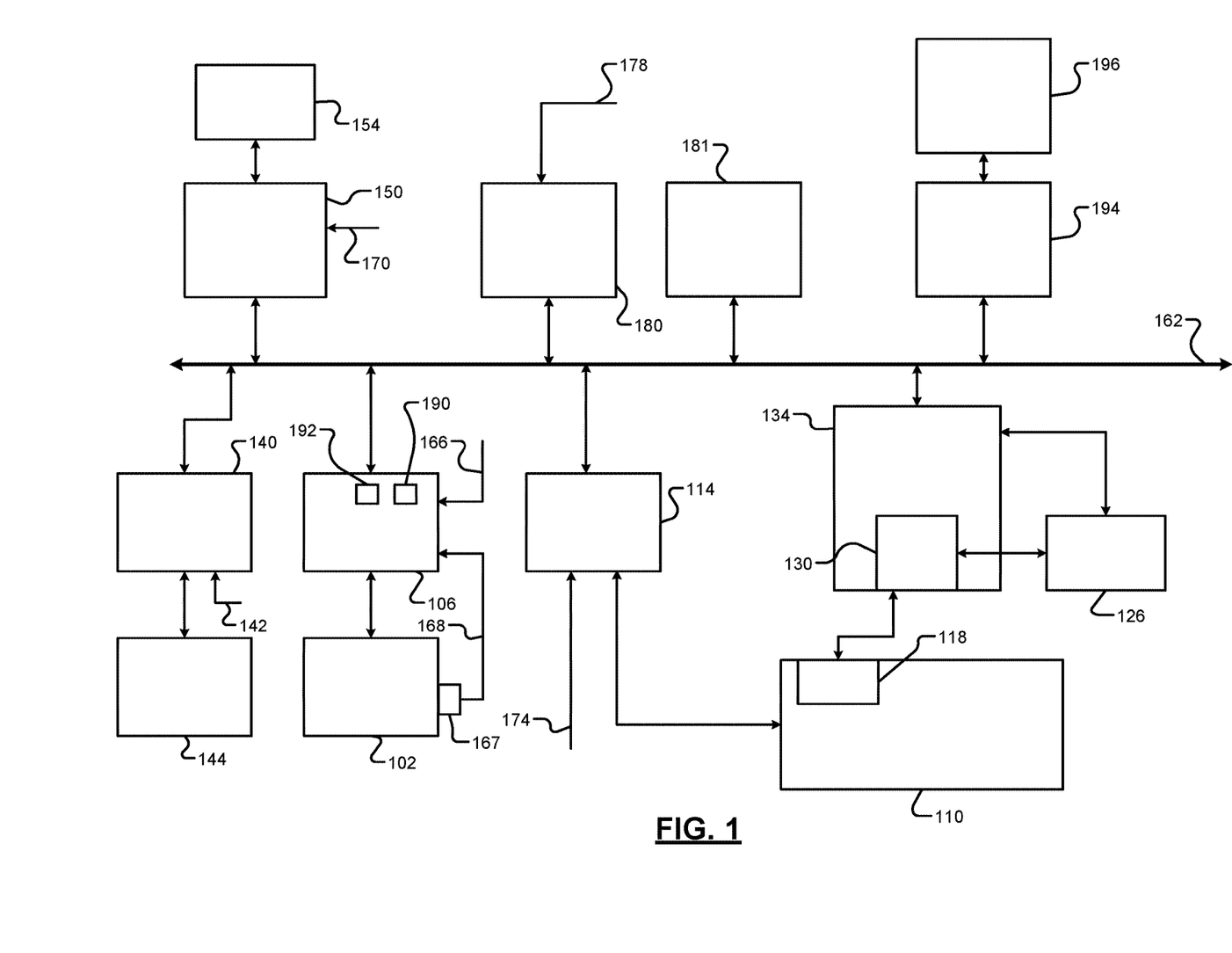
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, semi-autonomous vehicles, non-autonomous vehicles, and other types of vehicles.

An engine 102 combusts an air/fuel mixture to generate drive torque. An engine control module (ECM) 106 controls the engine 102 based on a torque request, such as a torque request determined based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. The electric motor 118 can act as either a generator at some times or as a motor at other times. When acting as a generator, the electric motor 118 converts mechanical energy into electrical energy. The electrical energy can be, for example, used to charge a battery 126 via a power control device (PCD) 130 (e.g., including an inverter). When acting as a motor, the electric motor 118 outputs positive torque that may be used, for example, to supplement or replace torque output by the engine 102. While the example of one electric motor is provided, the vehicle may include more than one electric motor. Regeneration occurs when the electric motor 118 is converting mechanical energy into electrical energy. Regeneration slows (brakes) the vehicle.

A power inverter control module (PIM) 134 controls the PCD 130 to control power flow to and from the electric motor 118. At some times, the PIM 134 controls the PCD 130 to convert direct current (DC) power from the battery 126 into alternating current (AC) power and apply the AC power to the electric motor 118. The electric motor 118 outputs positive torque when power is applied to the electric motor 118. At other times, the PIM 134 controls the PCD 130 also converts AC power generated by the electric motor 118 into DC power and provides the DC power, for example, to the battery 126. The electric motor 118 outputs negative torque (and decelerates the vehicle) when the electric motor 118 is outputting power. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle modules. A steering wheel angle sensor (SWA) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system. An electronic brake control module (EBCM) 150 selectively controls application of friction brakes 154 of the vehicle.

Modules of the vehicle may share parameters via a network 162, such as a controller area network (CAN). In vehicles, CAN may also stand for car area network. The network 162 may include one or more data buses. Various parameters may be made available by a given control module to other control modules via the network 162.

The driver inputs may include, for example, an accelerator pedal position (APP) 166, which may be provided to the ECM 106. An engine speed sensor 167 may measure an engine speed 168 (e.g., in revolutions per minute, RPM) and provide the engine speed 168 to the ECM 106. A brake pedal position (BPP) 170 may be provided to the EBCM 150. A position 174 of a range selector, such as a park, reverse, neutral, drive lever (PRNDL), may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle may also include one or more other sensors 181. Examples of the other sensors 181 include, for example, one or more laser imaging distancing and ranging (LIDAR) sensors, one or more radar sensors, one or more cameras, one or more sonar sensors, one or more temperature sensors, one or more pressure sensors, one or more speed sensors, and other types of sensors. One or more control modules may control respective devices based on input from one or more of the one or more other sensors 181. For example, based on input from one or more of the one or more other sensors 181, the ECM 106 may control the engine 102, the PIM 134 may control the PCD 130, the steering control module 140 may control the EPS motor 144, and/or the EBCM 150 may control the friction brakes 154.

The vehicle may include one or more additional control modules that are not shown, such as a chassis control module, a battery pack control module, etc. The vehicle may omit one or more of the control modules shown and discussed.

Vehicle braking can be performed using the friction brakes 154, regeneration via the electric motor 118, or a combination of friction braking (using the friction brakes 154) and regeneration (using the electric motor 118). Based on the BPP 170, the EBCM 150 and the PIM 134 control friction braking and regenerative braking, respectively.

The ECM 106 includes a diagnostic module 190 that diagnoses whether one or more different faults are present based on various parameters. For example, the ECM 106 may diagnose the presence of a fault when one or more predetermined symptoms associated with the fault in a fault model 192 occur. The ECM 106 may determine that a symptom has occurred when one or more parameters associated with that symptom satisfy one or more predetermined conditions associated with the symptom. Examples of the predetermined conditions include, but are not limited to, the parameter being greater than a predetermined value, less than a predetermined value, within a predetermined range, or outside of a predetermined range.

The ECM 106 may include more than one fault model in various implementations. Also, while the example of the ECM 106 including the diagnostic module 190 is provided, one or more other modules of the vehicle may additionally or alternatively include a diagnostic module that diagnoses whether one or more faults are present in the vehicle based on one or more other fault models.

The ECM 106 stores a diagnostic trouble code (DTC) associated with a fault in memory when the fault is diagnosed. The ECM 106 may also take one or more other remedial actions when the fault is diagnosed, such as lighting a malfunction indicator (e.g., a light) and/or one or more other remedial actions.

The vehicle includes a diagnostic input/output port 194, such as an on-board diagnostic (OBD) II port. A diagnostic device 196 is configured to connect to the vehicle via the diagnostic input/output port 194, such as by wire or wirelessly by a vehicle service technician. The diagnostic device 196 can collect data from the vehicle, such as any faults diagnosed, one or more parameters associated with the diagnosis of a fault, and other data.

An example of the fault model 192 is provided below in table form. The fault model 192, however, may take other forms.

|  | Symptom 1 | Symptom 2 | Symptom 3 | Symptom 4 |
|---|---|---|---|---|
| Failure mode 1 |  | X |  |  |
| Failure mode 2 | X |  | X |  |
| Failure mode 3 |  |  |  | X |
| Failure mode 4 |  |  |  | X |

In the example above, the X in the column for symptom 2 indicates that failure mode 1 (a first fault) will be diagnosed when symptom 2 occurs. The Xs in the columns for symptoms 1 and 3 indicate that failure mode 2 (a second fault) will be diagnosed when symptoms 1 and 3 occur concurrently. The Xs in the column for symptom 4 indicates that failure mode 3 (a third fault) and failure mode 4 (a fourth fault) will be diagnosed when symptom 4 occurs. While the example of the symptoms being arranged in columns and the failure modes being arranged in rows is provided, the failure modes may be arranged in columns and the symptoms may be arranged in rows.

Some failure modes, however, may not be isolatable from other failure modes. Two or more different failure modes are not isolatable when the two or more failure modes will be diagnosed when the same one or more symptoms occur. For example, in the table above, both failure mode 3 and failure mode 4 will be diagnosed when symptom 4 occurs. Non-isolatable failure modes may make vehicle service more challenging.

The present application involves use of machine learning and other design documents to identify other symptoms that can be used to isolate failure modes in the fault model 192 that have the same symptoms. An updating module 200 (FIG. 2) updates the fault model 192 to include the other symptoms that can be used to separately diagnose the failure modes.

Figure 2:
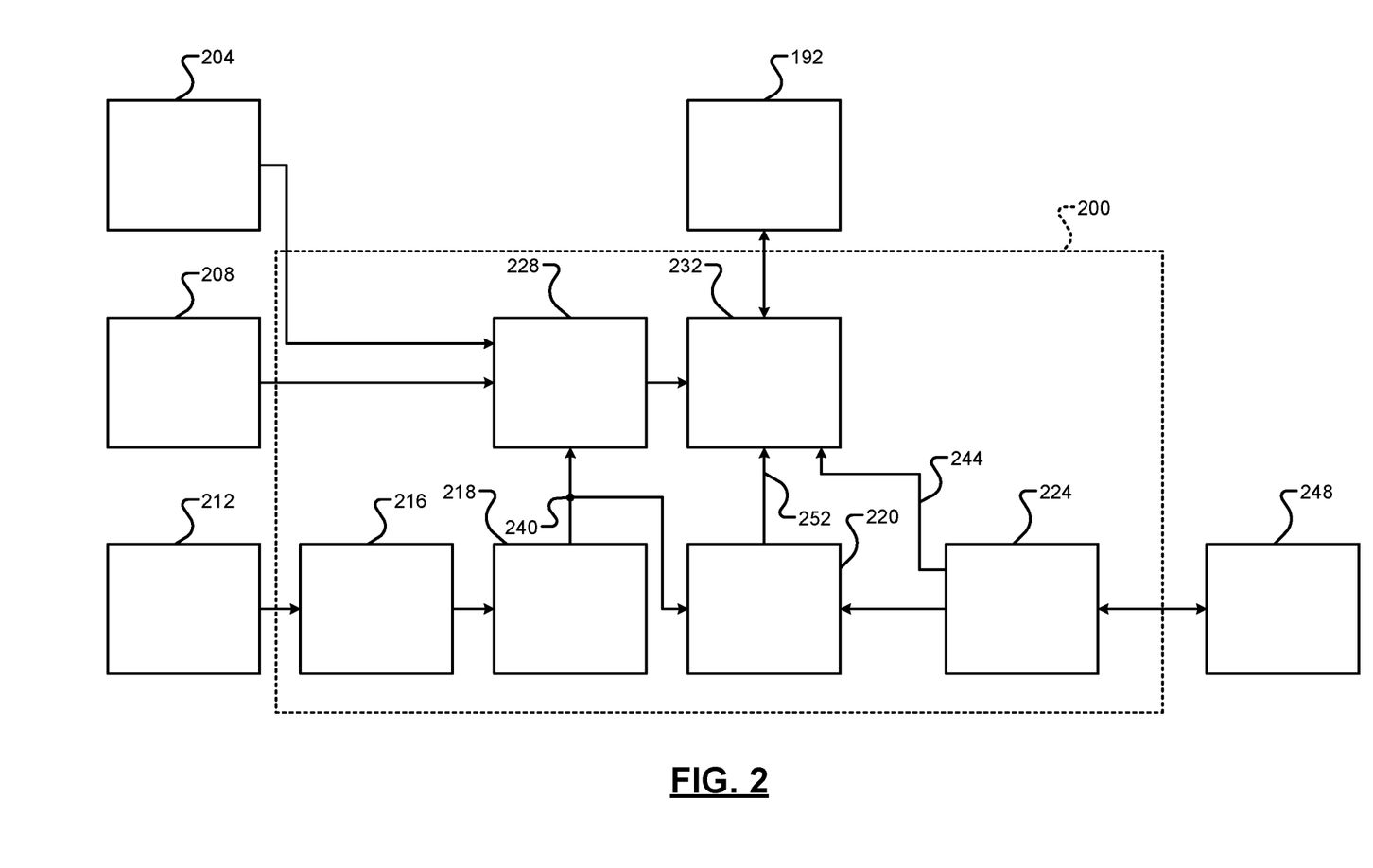
FIG. 2 is a functional block diagram including an example implementation of an updating module and a fault model.

The updating module 200 additionally or alternatively updates the fault model 192 to include other identified combinations of symptoms of that can be used to diagnose an existing failure mode and/or additional failure modes that are not already included in the fault model 192. The above better isolates failure modes (and the root cause) and improves detection accuracy of the fault model 192. The above also may help improve diagnostic and service procedures and may reduce warranty and vehicle service costs.

FIG. 2 includes a functional block diagram including an example implementation of the updating module 200. Design documents 204, failure mode data and healthy data 208, and new data 212 are stored in memory. The fault model 192 is also stored in memory. The fault model 192 may be written to memory of one or more vehicles to which the fault model 192 pertains.

Examples of the design documents 204 include, for example, design failure mode and effects analysis (DFMEA) documents, parts (PRTS) documents, warranty documents, expert documents, and other types of documents. The failure mode data and health data 208 includes a data set including vehicle parameters and features for faulty components and a data set including vehicle parameters and features for non-faulty components. As used herein, features are parameters calculated based on one or more other parameters. Examples of features include acceleration (calculated based on engine speed), kurtosis (calculated based on the engine speed), jerk (calculated based on engine speed), other parameters calculated based on engine speed, and other parameters calculated on one or more other vehicle parameters. The new data 212 includes a data set including vehicle parameters and features.

The updating module 200 includes a filter module 216, a feature module 218, a labeling module 220, a user interface module 224, a failure mode module 228, and a model adjusting module 232. The filter module 216, the feature module 218, the labeling module 220, the user interface module 224, the failure mode module 228, and the model adjusting module 232 are discussed below with respect to FIGS. 3 and 4.

Figure 3:
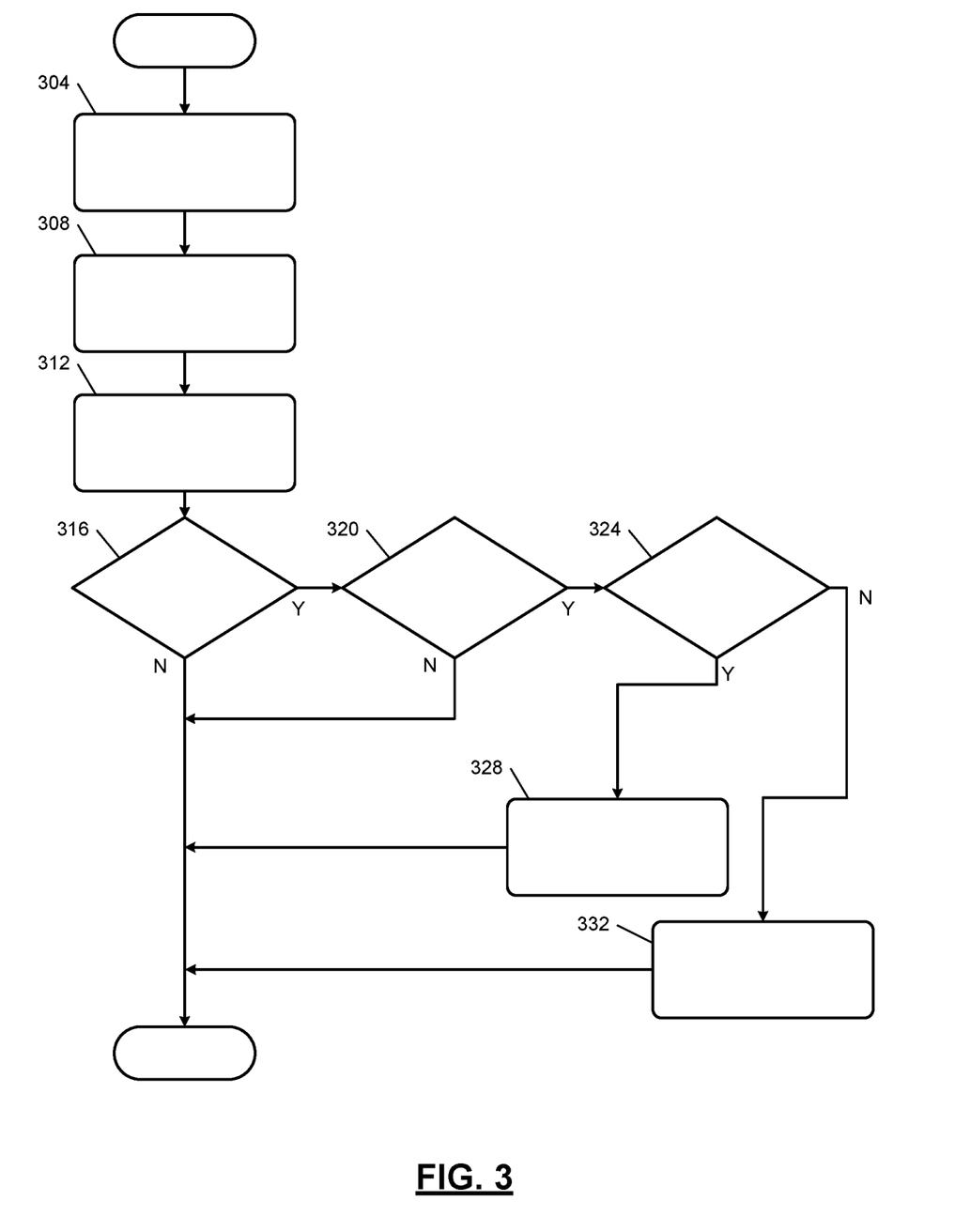
FIGS. 3 and 4 are example methods of selectively augmenting a fault model.

FIG. 3 is a flowchart depicting an example method of selectively augmenting the fault model 192. Control begins with 304 where the filter module 216 rationality checks the new data 212 and removes non-rational values of the new data 212. For example, the filter module 216 may remove values from the new data 212 that are outside of a predetermined range, stuck at a predetermined value, and/or satisfy one or more conditions of non-rationality.

At 308, the filter module 216 filters the remaining values of the new data 212. For example, the filter module 216 may remove null values, filter values to reduce noise, and/or perform one or more other signal processing functions. At 312, the feature module 218 determines features 240 based on the remaining values. For example, the feature module 218 may determine acceleration based on engine speed, kurtosis based on the engine speed, jerk based on the engine speed, one or more other parameters based on engine speed, and/or one or more other features based on one or more other vehicle parameters.

At 316, the failure mode module 228 determines whether the filtered data includes a new set of one or more symptoms and/or classifiers that is not presently in the fault model 192. The new set may be indicative of the occurrence of a failure mode. The failure mode may be new failure mode that is not presently in the fault model 192 or another set of symptoms and/or classifiers for a failure that is already present in the fault model 192.

A classifier is a new symptom that is not already present in the fault model 192. A classifier has occurred when one or more parameters associated with that classifier satisfy one or more predetermined conditions associated with the classifier. If 316 is false, the model adjusting module 232 leaves the fault model 192 unchanged, and control may end. If 316 is true, control transfers to 320.

The failure mode module 228 may determine the classifier(s) (e.g., the predetermined conditions for diagnosing the presence of the classifiers), for example, based on the failure mode data and healthy data 208 using machine learning. For example only, the failure mode module 228 may select which feature(s) to compare with the boundaries of the classifier(s) based on the suggested classifiers included in the design documents 204. For example, the failure mode module 228 may parse the design documents 204 for words, relationships, phrases, or other artifacts indicative of the parameters.

The failure mode module 228 may determine the boundaries of the classifiers using transudative learning, such as a one-class support vector machine (SVM) based on the failure mode data and healthy data 208. Based on the failure mode data and healthy data 208, the SVM may define boundaries of a classifier. Values that fall within the boundaries may indicate that the classifier is not present, while values that fall outside of the boundaries indicate the presence of the classifier.

At 320, the model adjusting module 232 may determine whether user input 244 indicative of a confirmation (e.g., by a subject matter expert) of the set of one or more symptoms and/or classifiers that are indicative of the occurrence of the new failure mode that is not presently in the fault model 192 has been received. When the set of one or more symptoms and/or classifiers is identified, the user interface module 224 may generate a user interface requesting confirmation (e.g., by the subject matter expert) that the set of one or more symptoms and/or classifiers are indicative of the occurrence of a new failure mode that that should be included in the fault model 192. For example, the user interface module 224 may display the set on a display. User input/output (I/O) devices 248 may include the display and one or more other user input and/or output devices, such as a keyboard, a mouse, etc. In various implementations, the display may include a touchscreen display and be considered both a user output device and a user input device.

If 320 is false (e.g., no user input indicative of a confirmation is received or user input indicative of a denial of the set is received), the model adjusting module 232 leaves the fault model 192 unchanged, and control may end. If 320 is true (e.g., the model adjusting module 232 received the user input 244 indicative of the confirmation that the set should be included in the fault model 192), control transfers to 324.

At 324, the model adjusting module 232 determines whether the set of symptoms and/or classifiers corresponds to a new failure mode that is not already included in the fault model 192. If 324 is true, the model adjusting module 232 adds the new failure mode and the set of symptoms and/or classifiers to the fault model 192 at 328. An example of the fault model 192 above with added sets of symptoms and classifiers associated with new failure modes (Failure mode 5 and failure mode 6) is provided below in table form.

|  | Symptom 1 | Symptom 2 | Symptom 3 | Symptom 4 | Classifier 1 | Classifier 2 | Classifier 3 |
|---|---|---|---|---|---|---|---|
| Failure mode 1 |  | X |  |  |  |  |  |
| Failure mode 2 | X |  | X |  |  |  |  |
| Failure mode 3 |  |  |  | X |  |  |  |
| Failure mode 4 |  |  |  | X |  |  |  |
| Failure Mode 5 | X | X |  |  |  | X | X |
| Failure Mode 6 | X |  |  | X | X | X |  |

If 324 is false, the model adjusting module 232 adds the set of symptoms and/or classifiers to the fault model 192 in association with the failure mode at 332. An example of the fault model 192 above with added sets of symptoms and classifiers associated with an existing failure mode (the second Failure mode 4) is provided below in table form.

|  | Symptom 1 | Symptom 2 | Symptom 3 | Symptom 4 | Classifier 1 | Classifier 2 | Classifier 3 |
|---|---|---|---|---|---|---|---|
| Failure mode 1 |  | X |  |  |  |  |  |
| Failure mode 2 | X |  | X |  |  |  |  |
| Failure mode 3 |  |  |  | X |  |  |  |
| Failure mode 4 |  |  |  | X |  |  |  |
| Failure Mode 4 |  | X |  |  |  | X | X |

Figure 4:
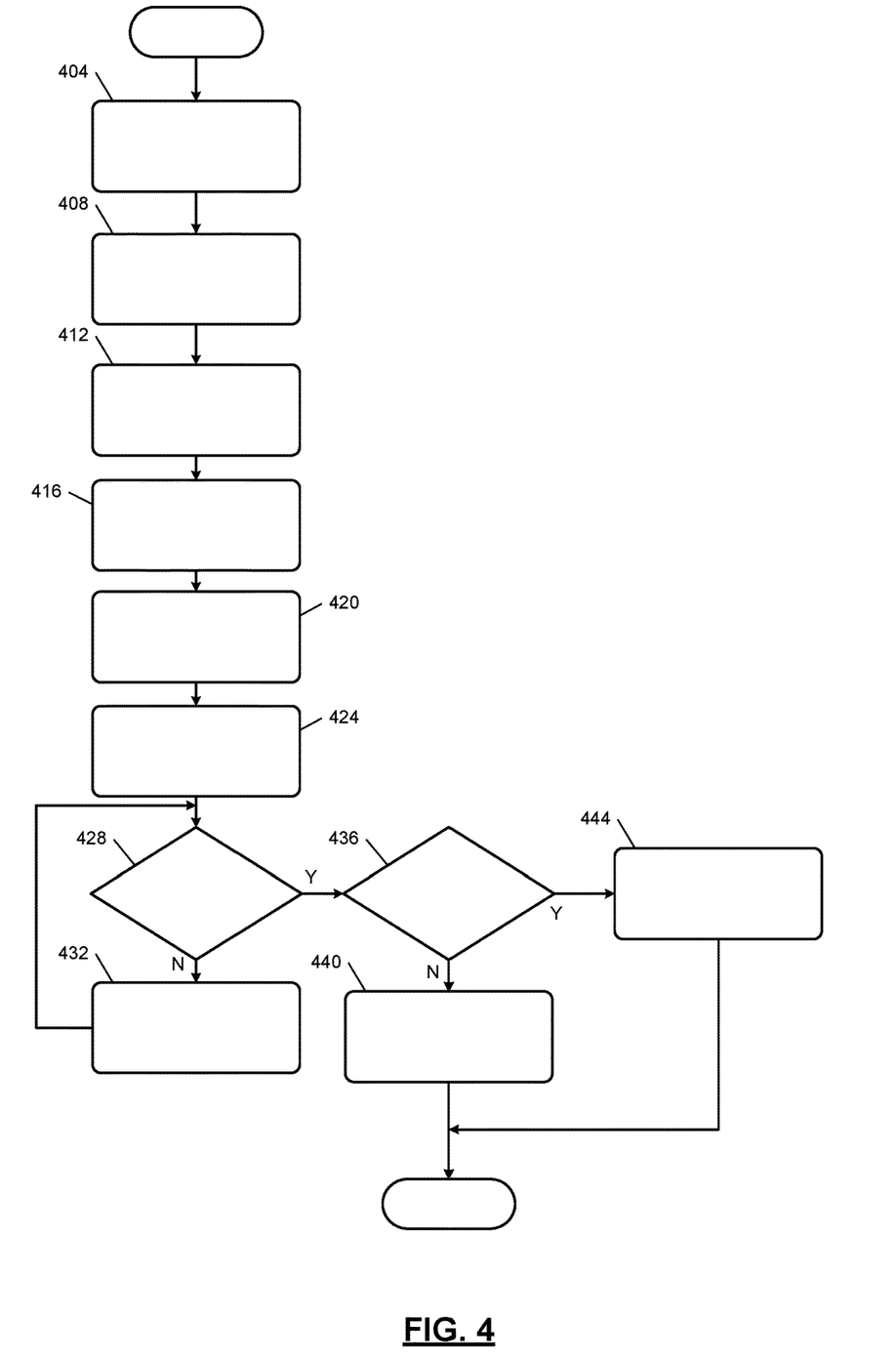

FIG. 4 is a flowchart depicting an example method of selectively augmenting the fault model 192. Control begins with 404 where the filter module 216 rationality checks the new data 212 and removes non-rational values of the new data 212. For example, the filter module 216 may remove values from the new data 212 that are outside of a predetermined range, stuck at a predetermined value, and/or satisfy one or more conditions of non-rationality.

At 408, the filter module 216 filters the remaining values of the new data 212. For example, the filter module 216 may remove null values, filter values to reduce noise, and/or perform one or more other signal processing functions. At 412, the feature module 218 determines the features 240 based on the remaining values. For example, the feature module 218 may determine acceleration based on engine speed, kurtosis based on the engine speed, jerk based on the engine speed, one or more other parameters based on engine speed, and/or one or more other features based on one or more other vehicle parameters.

At 416, the failure mode module 228 selects at least two failure modes that are non-isolatable (i.e., occur when the same set of two or more symptoms and/or classifiers occur). For example, as discussed above, Failure mode 3 and failure mode 4 are non-isolatable in the example table below because both failure mode 3 and failure mode 4 occur when symptom 4 occurs.

|  | Symptom 1 | Symptom 2 | Symptom 3 | Symptom 4 |
|---|---|---|---|---|
| Failure mode 1 |  | X |  |  |
| Failure mode 2 | X |  | X |  |
| Failure mode 3 |  |  |  | X |
| Failure mode 4 |  |  |  | X |

At 420, the failure mode module 228 determines one or more classifiers for isolating the two or more failure modes. The failure mode module 228 may determine the classifier(s) (e.g., the predetermined conditions for diagnosing the presence of the classifiers), for example, based on the failure mode data and healthy data 208 using machine learning. For example only, the failure mode module 228 may select which feature(s) to compare with the boundaries of the classifier(s) based on the suggested classifiers included in the design documents 204. For example, the failure mode module 228 may parse the design documents 204 for words, relationships, phrases, or other artifacts indicative of the parameters.

The failure mode module 228 may determine the boundaries of the classifiers using transudative learning, such as at least one classification model (e.g., a one-class support vector machine (SVM)) based on the failure mode data and healthy data 208. Based on the failure mode data and healthy data 208, the SVM may define boundaries of a classifier. Values that fall within the boundaries may indicate that the classifier is not present, while values that fall outside of the boundaries indicate the presence of the classifier.

At 424, the labeling module 220 labels the features 240 based on whether the features 240 were from the failure mode data or the healthy data. For example, the labeling module 220 may label ones of the features 240 from the healthy data as healthy (not faulty) and ones of the features 240 from the failure mode data as faulty (not healthy). The labeling module 220 outputs labeled features 252.

At 428, the model adjusting module 232 determines whether the labels given to the features 240 are consistent with how the features 240 would be labeled by the classifier. Ones of the features 240 that are within the boundaries of the classifier are identified as healthy (not faulty), while ones of the features 240 that are outside of the boundaries of the classifier are identified as faulty (not healthy). If 428 is true and the labels are consistent with the labeling provided via the classifier, the user interface module 224 outputs a request to confirm the labels and control transfers to 436. For example, the user interface module 224 may display the request to confirm the labels on the display. If 428 is false, the failure mode module 228 adjusts the boundaries of the classifier 432 to make the labels consistent at 432, and control returns to 428.

At 436, the model adjusting module 232 may determine whether the user input 244 indicative of a confirmation (e.g., by a subject matter expert) of the labels has been received. If 436 is false (e.g., no user input indicative of a confirmation is received or user input indicative of a denial of the set is received), the model adjusting module 232 leaves the fault model 192 unchanged at 440, and control may end. If 436 is true (e.g., the model adjusting module 232 received the user input indicative of the confirmation 244), control transfers to 444.

At 444, the model adjusting module 232 adds the classifier to the fault model 192 in association with the one of the failure modes. An example of the fault model 192 above with added classifiers associated with the failure mode 4 is provided below in table form. Given the updated version of the fault model 192 below, the failure mode 4 is isolatable/isolated from the failure mode 3.

ments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit

|  | Symptom 1 | Symptom 2 | Symptom 3 | Symptom 4 | Classifier 1 | Classifier 2 | Classifier 3 |
|---|---|---|---|---|---|---|---|
| Failure mode 1 |  | X |  |  |  |  |  |
| Failure mode 2 | X |  | X |  |  |  |  |
| Failure mode 3 |  |  |  | X |  |  |  |
| Failure mode 4 |  |  |  | X | X | X |  |

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodi- (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A fault diagnostic system, comprising:
   memory including a fault model, the fault model including:
      a plurality of failure modes of a vehicle; and
      symptoms respectively associated with each of the failure modes; and
   an updating module configured to:
      based on a data set, using machine learning, determine a new failure mode that is not already included in the fault model and new symptoms indicative of the occurrence of the new failure mode;
      modify the fault model by:
         adding the new failure mode to the fault model; and
         adding the new symptoms to the fault model in association with the new failure mode; and
      re-save the fault model including the new failure mode and the new symptoms in the memory.

2. A vehicle system including:
   the fault model of claim 1; and
   a diagnostic module configured to selectively diagnose faults in the vehicle based on one or more vehicle operating parameters and the fault model.

3. The vehicle system of claim 2 wherein the diagnostic module is configured to selectively diagnose a fault associated with the new failure mode when the one or more vehicle operating parameters are indicative of the new symptoms associated with the new failure mode occurring concurrently.

4. The fault diagnostic system of claim 1 wherein the updating module is configured to modify the fault model in response to receipt of user input indicative of a confirmation to add the new failure mode and the new symptoms.

5. The fault diagnostic system of claim 1 wherein the updating module is configured to determine boundaries for one of the new symptoms using at least one classification model and the data set.

6. The fault diagnostic system of claim 5 wherein the updating module is further configured to label values of the data set based on comparisons of the values with the boundaries and to selectively adjust the boundaries based on the comparisons.

7. The fault diagnostic system of claim 6 wherein the updating module is configured to label first ones of the values as being in a first state in response to a determination that the first ones of the values are within the boundaries and to label second ones of the values as being in a second state in response to a determination that the second ones of the values are not within the boundaries.

8. The fault diagnostic system of claim 1 wherein the fault model includes rows for the failure modes and columns for the symptoms.

9. A fault diagnostic system, comprising:
   memory including a fault model, the fault model including:
      a plurality of failure modes of a vehicle; and
      one or more symptoms associated with each of the failure modes; and
   an updating module configured to:
      based on a data set, using machine learning, determine a new combination of symptoms that are not already stored in the fault model in association with a first one of the failure modes and that are indicative of the occurrence of the first one of the failure modes;

modify the fault model by:
　　adding an additional entry for the first one of the failure modes to the fault model; and
　　adding the new combination of symptoms to the fault model in association with the first one of the failure modes; and
　re-save the fault model including the additional entry for the first one of the failure modes and the new combination of systems in the memory.

10. A vehicle system including:
　the fault model of claim 9; and
　a diagnostic module configured to selectively diagnose faults in the vehicle based on one or more vehicle operating parameters and the fault model.

11. The vehicle system of claim 10 wherein the diagnostic module is configured to selectively diagnose a fault associated with the first one of the failure modes when the one or more vehicle operating parameters are indicative of the new combination of symptoms associated with the first one of the failure modes occurring concurrently.

12. The fault diagnostic system of claim 9 wherein the updating module is configured to modify the fault model in response to receipt of user input indicative of a confirmation to add the additional entry for the first one of the failure modes to the fault model and the new combination of symptoms in association with the first one of the failure modes.

13. The fault diagnostic system of claim 9 wherein the updating module is configured to determine boundaries for one of the symptoms of the new combination of symptoms using at least one classification model and the data set.

14. The fault diagnostic system of claim 13 wherein the updating module is further configured to label values of the data set based on comparisons of the values with the boundaries and to selectively adjust the boundaries based on the comparisons.

15. The fault diagnostic system of claim 14 wherein the updating module is configured to label first ones of the values as being in a first state in response to a determination that the first ones of the values are within the boundaries and to label second ones of the values as being in a second state in response to a determination that the second ones of the values are not within the boundaries.

16. The fault diagnostic system of claim 9 wherein the fault model includes rows for the failure modes and columns for the symptoms.

17. A fault diagnostic system, comprising:
　memory including a fault model, the fault model including:
　　a plurality of failure modes of a vehicle; and
　　one or more symptoms associated with each of the failure modes; and
　an updating module configured to:
　　identify a first one of the failure modes having a first set of one or more associated symptoms and a second one of the failure modes having a second set of one or more associated symptoms, wherein the first set of one or more associated symptoms is the same as the second set of one or more associated symptoms;
　　in response to a determination that the first set of one or more associated symptoms is the same as the second set of one or more associated symptoms, based on a data set, using machine learning, determine at least one new symptom that is not in the first set of one or more associated symptoms that is indicative of the occurrence of the first one of the failure modes;
　　modify the fault model by adding the at least one new symptom to the fault model in association with the first one of the failure modes; and
　　re-save the fault model including the at least one new symptom in the memory.

18. A vehicle system including:
　the fault model of claim 17; and
　a diagnostic module configured to selectively diagnose faults in the vehicle based on one or more vehicle operating parameters and the fault model.

19. The fault diagnostic system of claim 17 wherein the updating module is further configured to:
　in response to the determination that the first set of one or more associated symptoms is the same as the second set of one or more associated symptoms, based on the data set, determine at least one second new symptom that is not in the second set of one or more associated symptoms that is indicative of the occurrence of the second one of the failure modes;
　modify the fault model by adding the at least one second new symptom to the fault model in association with the second one of the failure modes; and
　re-save the fault model in the memory.

20. The fault diagnostic system of claim 17 wherein the updating module is configured to modify the fault model in response to receipt of user input indicative of a confirmation to add the at least one new symptom to the fault model in association with the first one of the failure modes.

* * * * *